United States Patent
Widemann

(10) Patent No.: US 6,360,537 B1
(45) Date of Patent: Mar. 26, 2002

(54) SYSTEM FOR CONTROLLING A HYDRAULIC VEHICLE DRIVE

(75) Inventor: Axel Widemann, Neumunster (DE)

(73) Assignee: Sauer-Danfoss Inc., Ames, IA (US)

( * ) Notice: Subject to any disclaimer, the term of this patent is extended or adjusted under 35 U.S.C. 154(b) by 0 days.

(21) Appl. No.: 09/618,534

(22) Filed: Jul. 18, 2000

(30) Foreign Application Priority Data

Jul. 23, 1999 (DE) .......................................... 199 34 782

(51) Int. Cl.[7] .............................................. F16D 31/02
(52) U.S. Cl. ........................................................ 60/451
(58) Field of Search ........................... 60/451, 446, 450

(56) References Cited

U.S. PATENT DOCUMENTS

| | | | |
|---|---|---|---|
| 3,543,508 A | * 12/1970 | Scwab | ........................... 60/451 |
| 3,969,896 A | * 7/1976 | Louis | ........................... 60/451 |
| 3,999,387 A | * 12/1976 | Knopf | ........................... 60/451 |
| 4,444,286 A | * 4/1984 | Hawkins | ....................... 60/451 |

* cited by examiner

Primary Examiner—Edward K. Look
Assistant Examiner—Igor Kershteyn
(74) Attorney, Agent, or Firm—Zarley, McKee, Thomte, Voorhees & Sease, PLC

(57) ABSTRACT

In a hydraulic vehicle drive which has a hydraulic circuit consisting of a variable displacement pump (2) and a hydraulic motor (10), the variable displacement pump (2) is driven by a diesel engine (1). During the braking or over-running operation of the vehicle, the hydraulic motor becomes the pump and drives the variable displacement pump (2) which acts as a motor on the diesel engine (1) and attempts to accelerate the latter. The braking effect which is intended and obtained thereby involves the risk of the diesel engine (1) reaching impermissibly high rotational speeds. The braking therefore takes place in a controlled manner by a sequence valve (16) being arranged in the line (12) between the hydraulic motor (10) and the variable displacement pump (2). The sequence valve acts on the pivot angle of the variable displacement pump (2) via the pump bypass line (12B). The control takes place in such a manner that the product of the displacement volume of the variable displacement pump (2) and of the pressure of the hydraulic fluid in the line (12) upstream of the variable displacement pump (2) remains approximately constant. In addition, flow control valves (13) may also be present.

8 Claims, 2 Drawing Sheets

SYSTEM FOR CONTROLLING A HYDRAULIC VEHICLE DRIVE

BACKGROUND OF THE INVENTION

1. Field of the Invention

The invention relates to a method for controlling a hydraulic vehicle drive, in which a variable displacement pump, which is driven by a diesel engine, conveys hydraulic fluid in a closed circuit to and from a hydraulic motor, which drives the driving wheels of the vehicle.

The invention also relates to an arrangement for controlling a hydraulic vehicle drive, having a closed hydraulic circuit which has a variable displacement pump, which is driven by a diesel engine. A hydraulic motor drives the driving wheels of the vehicle, and two lines which connect the variable displacement pump and the hydraulic motor are the feed or return line for the hydraulic motor, depending on the direction of travel of the vehicle.

2. Description of the Related Art

If the variable displacement pump and the hydraulic motor of prior art systems are set up for two conveying directions, the vehicle can be changed over from forward to rearward travel by the direction of flow of the hydraulic fluid being reversed. Furthermore, the hydraulic vehicle drive can also act as a brake, if the vehicle changes into braking or overrunning operation. In this case, the diesel engine which drives the variable displacement pump changes to idling, and the conveying flow of the variable displacement pump is reduced to zero by means of a reduction in the pump pivot angle. However, the traveling speed remains unchanged initially as a consequence of the inertia of the moving vehicle. The power flow from the variable displacement pump to the hydraulic motor or motors then turns around, and the hydraulic motor operates as a pump. The variable displacement pump then acts as a hydraulic motor. The direction of flow of the hydraulic fluid remains unchanged, but it is now conveyed by the hydraulic motor in the direction of the variable displacement pump. The variable displacement pump builds up hydraulic resistance, and the operating pressure (braking pressure) of the closed hydraulic circuit is increased as a result. This produces a torque which attempts to accelerate the diesel engine in the braking or overrunning operation. If the nominal rotational speed of the diesel engine is substantially exceeded, the latter may be damaged, in particular if it is a diesel engine which is provided with a turbocharger.

In some prior art systems, a pressure regulating valve acts as a restrictor when the hydraulic fluid flowing back from the hydraulic motor is at an increased pressure. As a result, a targeted conversion of energy from flow energy into heat takes place, and the braking energy is correspondingly reduced. Diesel engine damage stemming from the braking or overrunning operation is then ruled out. However, this system has the disadvantage that the conversion of flow energy into heat takes place regardless of which pivot angle is set at the variable displacement pump. Therefore, this takes place regardless of the torque which the variable displacement pump can deliver to the diesel engine. As the pivot angle of the pump decreases, the torque is reduced at constant pressure, so that the braking potential of the diesel engine cannot be used optimally. It is also disadvantageous that the entire flow of hydraulic fluid is conducted via the pressure regulating valve, which acts as a restrictor. Therefore, during the restricting of the conveying flow, the entire restricted flow energy is converted completely into heat. This results in an undesirable increase in the temperature of the hydraulic fluid.

Therefore, a principal object of this invention is to provide a system for controlling a hydraulic vehicle drive in such a manner that as little flow energy of the hydraulic fluid as possible is converted into heat, and that the torque of the diesel engine is used optimally in the overrunning operation.

SUMMARY OF THE INVENTION

The design according to the invention is based on the consideration that the vehicle drive is configured for maximum conveying flow even for the braking and overrunning operation. Since, however, as the traveling speed decreases the amount of conveyed hydraulic fluid is reduced, the restricting effect of the closed circuit becomes lower, and so a higher pressure can build up in the line upstream of the variable displacement pump. As a result, as the traveling speed decreases, the difference in pressure at the variable displacement pump increases. That portion of flow energy which has still to be converted into heat is reduced thereby, since the reduced difference in pressure becomes smaller overall.

The novel method of this invention comprises a sequence valve responding to the pressure, which is produced by the hydraulic motor, to control the pivot angle of the variable displacement pump. At least one pressure regulating valve and a main circular orifice are arranged in parallel in the line downstream of the sequence valve, in the direction of flow of the hydraulic fluid. This arrangement provides that the product of the displacement volume of the variable displacement pump and of the pressure of the hydraulic fluid in the line upstream of the variable displacement pump remain approximately constant.

A further advantageous refinement of this consists in a one-way or check valve being arranged in parallel connection to the constructional unit consisting of the sequence valve, a restrictor or an orifice, at least one pressure regulating valve and a main circular orifice. The check valve blocks the throughflow of the hydraulic fluid in the direction from the hydraulic motor to the variable displacement pump, but releases or allows it in the opposite direction. This refinement achieves the result that in spite of the built-in parts in the high pressure line for the braking operation, undisturbed operation is possible at any time in the reverse direction of travel. In this case, the hydraulic fluid bypasses the sequence valve, orifice and pressure regulating valve and flows through the opened check valve from the variable displacement pump to the hydraulic motor. The main circular orifice brings about a targeted restriction of the hydraulic fluid in such a manner that, in the braking or overrunning operation and at maximum vehicle speed, the pressure regulating valve immediately closes.

A further advantage of the instant invention is that the arrangement is performed in such a manner that in the braking operation the variable displacement pump is directed by the sequence valve to a relatively large pivot angle if the sequence valve, by reaching the set increased pressure, is responding for the first time. After that, the pivot angle is then restored stepwise because the pressure in the line upstream of the variable displacement pump increases because the conveying amount is becoming smaller.

This can be configured purely hydraulically. However, a combination of electronics and hydraulic circuitry is also possible in that the rotational speed of the diesel engine being incorporated as the influencing variable. This is accomplished by an electrically proportional sequence valve which is controlled by an electronic control device as a function of rotational speed of the diesel engine, which controls the pivot angle of the variable displacement pump via a pump bypass line, if the increased pressure is present in the pump bypass line.

DETAILED DESCRIPTION OF THE PREFERRED EMBODIMENTS

Figure 1:
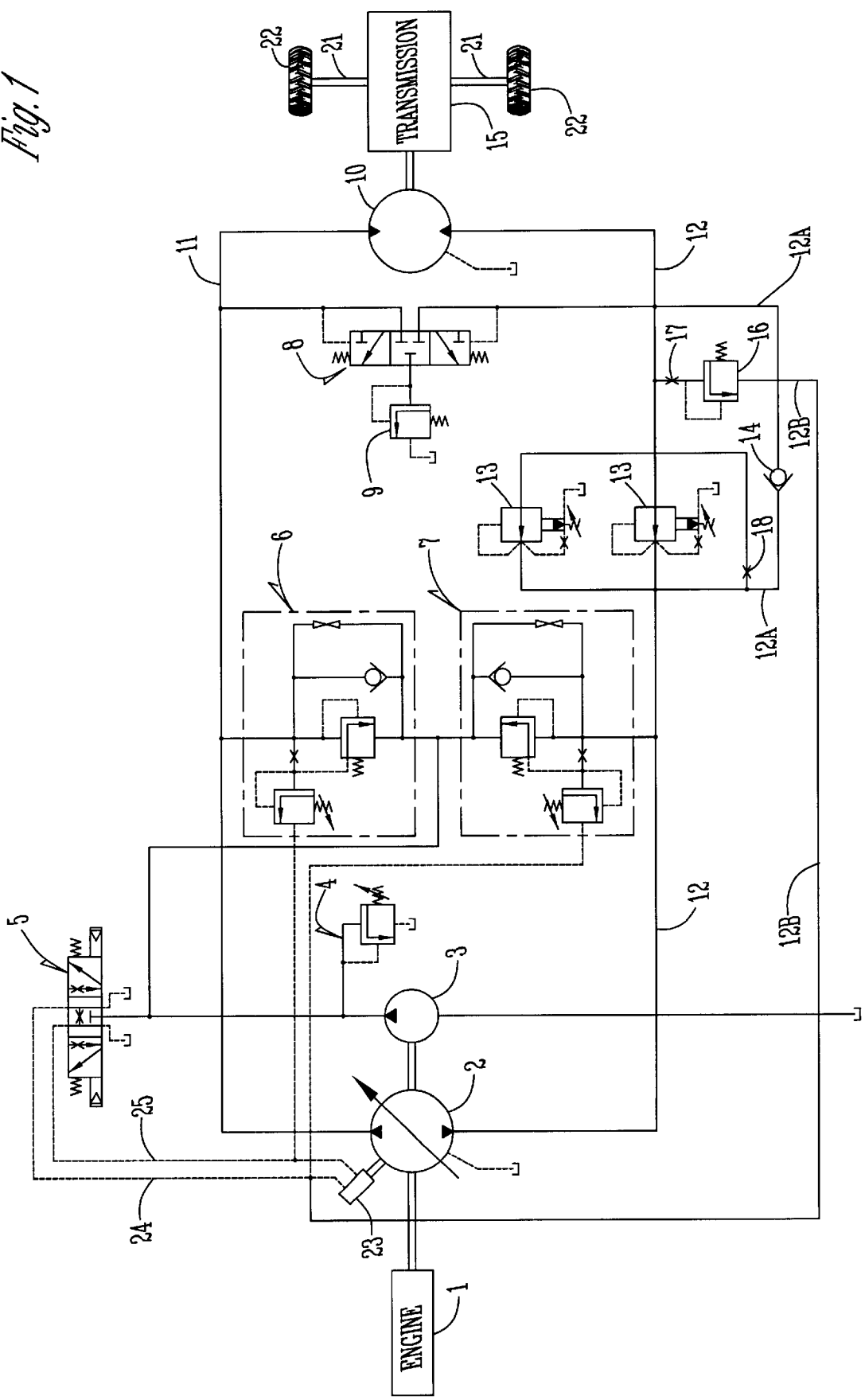
FIG. 1 is a schematic circuit drawing of the invention.

According to FIG. 1, a diesel engine 1 drives a variable displacement pump 2, which is equipped with a feed pump 3. The numeral 4 designates a feed pressure limiting valve. A servo adjustment valve 5 acts on the pivot angle of the variable displacement pump through command lines 24, 25 and servo 23 to vary the displacement volume of said pump. The servo adjustment valve 5 can be mechanical, hydraulic, or electrohydraulic. The numerals 6 and 7 designate high pressure limiting valves. The numerals 8 and 9 designate a flush valve and a flush pressure limiting valve, respectively. The variable displacement pump 2 conveys hydraulic fluid through the line 11 to the hydraulic motor 10 from which the hydraulic fluid flows back through the line 12 to the variable displacement pump 2 again. The variable displacement pump 2, the hydraulic motor 10 and the lines 11, 12 form the closed hydraulic circuit. The lines 11, 12 are both high pressure lines because high pressure is present in a normal driving operation, if the hydraulic fluid is flowing from the variable displacement pump to the hydraulic motor 10. There is then low pressure in the return line, in which the hydraulic fluid flows from the hydraulic motor 10 to the variable displacement pump 2. The low pressure is set by the feed-pressure limiting valve 4. The direction of flow of the hydraulic fluid can be reversed by means of the variable displacement pump 2, as a result of which the direction of travel of the vehicle can likewise be reversed. The hydraulic motor 10 acts on at least one of the wheels 22 of the vehicle via a transmission 15 and an axle 21.

Installed in the line 12 is a pressure regulating valve 13 which, at increased pressure of the hydraulic fluid flowing back from the hydraulic motor 10, can act as a restrictor. A one-way or check valve 14 is imposed in line 12A. The two pressure regulating valves 13 are connected in parallel. The volumetric flow is divided between them. They act and are set identically. The line 12B contains an orifice 17 and a sequence valve 16, which is connected to the command line 24 of the servo adjustment valve 5 of the variable displacement pump 2 via the pump bypass line 12B. Preferably the orifice 17 is a fixed orifice. The sequence valve 16 is preferably a spring biased, pilot pressure operated valve that is responsive or sensitive to pressure downstream of the orifice 17 in line 12B.

For the normal propulsion drive, the feed and high-pressure limiting valves 6 and 7 are set to a fixed value in order to safeguard the maximum operating pressure. The pilot control of these valves is produced by connection to lines 25 and 24 respectively of the servo adjustment valve 5 and therefore the valves 6 and 7 are also connected to the servo adjustment of the variable displacement pump 2. This normal pressure limiting function has the effect that when the set pressure of the hydraulic fluid in normal traction operation is exceeded, the variable displacement pump is automatically destroked so that its conveying amount is reduced, in order to limit the high pressure by reducing the forward volume and to reduce the energy converted into heat.

When the vehicle is being braked, the hydraulic motor 10, which is driven by the vehicle wheels 22, acts as a pump, and the high pressure of the hydraulic fluid is now in the line 12. In the prior art, the variable displacement pump 2 has to pivot out further in this case, i.e. has to increase the conveying amount, in order to keep the pressure approximately constant. However, in braking or overrunning operation the above mentioned pressure regulating valves 13 insure that the maximum operating pressure, which is set for the reverse travel of the vehicle, can no longer be reached. The main circular orifice 18 is coordinated in such a manner that at maximum traveling speed and with reversal of the operating point in the braking and overrunning operation, the volumetric flow is restricted to such an extent that the pressure regulating valves 13 immediately begin to close. At a volumetric flow of 400 bar per minute and at a pressure applied by the hydraulic motor during overrunning operation of 450 bar, with the pressure regulating valves 13 being set to a pressure of approximately 180 bar, the main circular orifice 18 having a diameter of approximately 7 mm is produced. The sequence valve 16 then acts together with the braking pressure, which is applied by the hydraulic motor 10, on the pivot angle of the variable displacement pump 2 to effect an increase thereof such that the conveying volume of the variable displacement pump is increased until an equilibrium, i.e. a constant pressure, is applied at the hydraulic motor 10. This achieves a constant deceleration of the vehicle. On further deceleration of the vehicle, the volumetric flow of the hydraulic fluid in the line 12 is lower. The drop of pressure at the main circular orifice 18 is therefore also reduced, so that the pressure, which prevails between the pressure regulating valves 13 and the variable displacement pump 2 in the line 12, in the hydraulic fluid rises. In this state, the pressure regulating valves 13 close completely. In order to maintain equilibrium, the variable displacement pump 2 continues to reduce the pivot angle, to also reduce the conveying amount. At the same time, the hydraulic fluid pressure, which is present in the line 12 between the pressure regulating valve 13 and the variable displacement pump 2 increases. This coordination takes place in such a manner that the product of the displacement volume of the variable displacement pump 2 and of the pressure of the hydraulic fluid in the line upstream of the variable displacement pump 2 remains approximately constant. The orifice 17 serves to limit the entire volumetric flow in the servo system of the variable displacement pump 2, and therefore ensures that no impermissibly high pressures are able to occur within the servo system of the variable displacement pump 2.

Figure 2:
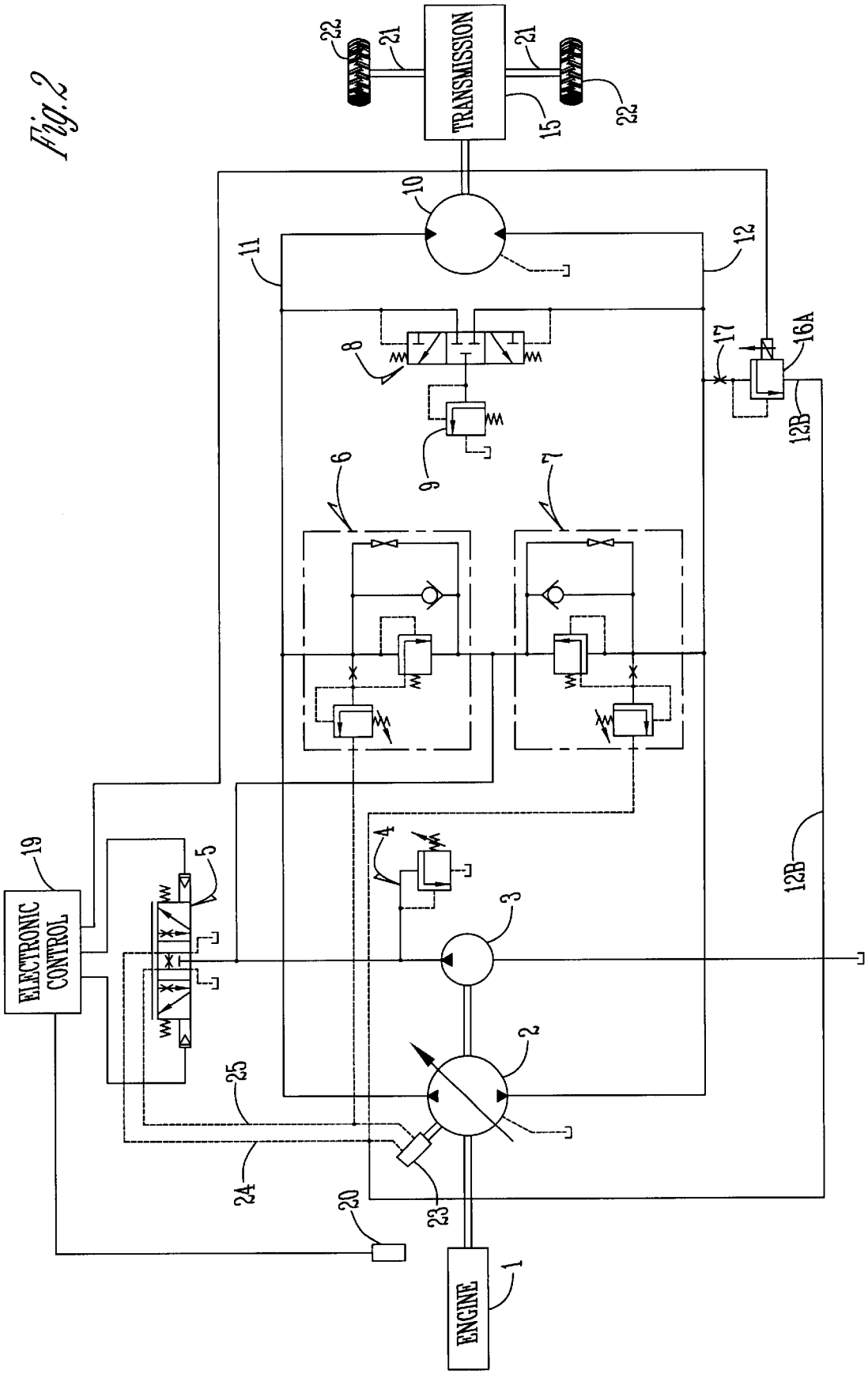
FIG. 2 is a schematic circuit drawing of the invention wherein a combination of electronic and hydraulic circuits have been added.

With reference to FIG. 2, electronic and hydraulic control elements are combined. The design of the closed hydraulic circuit is basically the same as in the arrangement according to FIG. 1, and parts of identical design are therefore provided with the same reference numbers. The pressure valves 13, check valve 14 and main circular orifice 18 are omitted in the arrangement of FIG. 2. The servo adjustment can basically be affected mechanically, hydraulically or electrohydraulically, but in FIG. 2 the example the electrohydraulic design is illustrated. Via an electronic control device 19, a traveling signal is set into a pivot-angle position of the variable displacement pump 2 via the servo adjustment valve 5, and thus at high pressure a certain traveling speed of the vehicle is achieved via the rotational speed of the motor 10.

The electronic control device 19 processes the signal, which is received via the rotational-speed sensor 20, for the rotational speed of the diesel engine 1 and therefore of the variable displacement pump 2. This processing can be used to regulate the power and is not described in more detail here. However, the rotational-speed sensor 20 is likewise required for the braking and overrunning operations. As the vehicle is being braked, high pressure is produced in the line 12. In this state, the motor 10 operates as a pump, and the variable displacement pump 2 operates as a motor and attempts to drive the diesel engine 1. If a certain, preset rotational speed of the diesel engine is exceeded, the rotational-speed sensor 20 passes a signal via the electronic control device 19 to a proportional solenoid which changes the bias or pressure setting of the sequence valve 16A in a proportional manner. The normally closed sequence valve 16A is connected to the servo adjustment valve 5 of the variable displacement pump 2 again by the pump bypass line 12B. The logic of the connection is such that when there is pressure in the line 12B, and when the sequence valve 16A is opened, in the braking operation the variable displacement pump 2 sets the pivot angle to the maximum value, i.e. the maximum conveying volume. Via the sequence valve function, the servo adjustment valve 5 is then overdriven and the variable displacement pump 2 pivoted out further until the diesel engine 1 has again reached its permissible rotational speed. When the permissible rotational speed is undershot, the pressure setting at the sequence valve 16A is increased, so that the product of the displacement volume of the variable displacement pump 2 and of the pressure of the hydraulic fluid in the line 12 upstream of the variable displacement pump 2 remains approximately constant. At a constant rotational speed, the friction torque of the diesel engine 1 assumes an approximately constant value which is in equilibrium with the torque exerted by the variable displacement pump 2. The advantage of this solution resides in the fact that there is virtually no hydraulic restriction of the conveying flow and therefore no energy is converted into heat.

In addition to the proportional electro-hydraulic sequence valve 16A (FIG. 2), the solution can also be obtained via a plurality of pressure limiting valves in each case set fixedly to a different pressure. These fixedly set valves can be actuated both hydraulically and electrically.

The hydraulic motor 10 can be designed both as a constant unit (fixed displacement volume) and as a variable displacement unit (variable displacement volume). Which of the two to be used depends on the sphere of use of the vehicles which are to be fitted with them.

It is therefore seen that this invention will achieve at least all of its stated objectives.

What is claimed is:

1. A system for controlling a hydraulic drive of a vehicle including a variable displacement hydraulic pump driven by an engine and including a servo for varying the displacement of the pump, a servo adjustment valve connected to the servo by a command signal line, a hydraulic motor for driving at least one driving wheel of the vehicle and being connected to the pump in a closed hydraulic circuit by a pair of high pressure lines, the system comprising:

a pump bypass line connecting one of the high pressure lines with the command signal line;

an orifice in the pump bypass line;

a normally closed sequence valve in the pump bypass line downstream of the orifice, the sequence valve being openable in response to pressure downstream of the orifice in the pump bypass line;

the sequence valve opening at a pre-determined pressure during a braking or over-running condition of the vehicle such that pump displacement is varied to keep the displacement of the pump times the pressure upstream of the pump in said one of the high pressure lines approximately constant.

2. A system for controlling a hydraulic drive of a vehicle including a variable displacement hydraulic pump driven by an engine and including a servo for varying the displacement of the pump, a servo adjustment valve connected to the servo by a command signal line, a hydraulic motor for driving at least one driving wheel of the vehicle and being connected to the pump in a closed hydraulic circuit by a pair of high pressure lines, the system comprising:

a pump bypass line connecting one of the high pressure lines with the command signal line;

an orifice in the pump bypass line;

a normally closed sequence valve in the pump bypass line downstream of the orifice, the sequence valve being openable in response to pressure downstream of the orifice in the pump bypass line;

the sequence valve opening at a pre-determined pressure during a braking or over-running condition of the vehicle such that pump displacement is varied to keep the displacement of the pump times the pressure upstream of the pump in said one of the high pressure lines approximately constant;

wherein at least one pressure regulating valve and a main circular orifice are arranged in parallel in said one of the high pressure lines downstream of the sequence valve.

3. The system of claim 2 wherein a check valve is arranged in parallel connection to the sequence valve and orifice, as well as the pressure regulating valve and main circular orifice, wherein the check valve prevents hydraulic fluid from flowing in a direction from the hydraulic motor to the pump, but allows fluid flow in an opposite direction.

4. The system of claim 3 wherein the pressure regulating valve is set to immediately close when the vehicle is in the braking or over-running condition at maximum vehicle speed.

5. The system of claim 1 wherein the sequence valve is a pilot pressure operated valve having a pilot pressure input.

6. The system of claim 5 wherein the sequence valve is a spring biased pilot pressure operated valve.

7. The system of claim 5 wherein the sequence valve has an electrically operated proportional solenoid arranged in opposition to the pilot pressure input.

8. The system of claim 1 wherein the sequence valve is an adjustable pressure electro-hydraulic sequence valve in which the pressure downstream of the orifice in the pump bypass line is opposed by a proportional solenoid responsive to an electrical control signal generated by an electronic control as a function of engine speed.

* * * * *